(12) United States Patent
Ishigami et al.

(10) Patent No.: US 9,360,640 B2
(45) Date of Patent: Jun. 7, 2016

(54) FERRULE FIXING MEMBER

(71) Applicant: Hitachi Metals, Ltd., Tokyo (JP)

(72) Inventors: Yoshiaki Ishigami, Hitachi (JP); Yoshinori Sunaga, Hitachinaka (JP); Kouki Hirano, Hitachinaka (JP); Hiroki Yasuda, Mito (JP); Masataka Satoh, Hitachi (JP); Juhyun Yu, Mito (JP); Takumi Kobayashi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 113 days.

(21) Appl. No.: 14/156,830

(22) Filed: Jan. 16, 2014

(65) Prior Publication Data

US 2014/0233896 A1 Aug. 21, 2014

(30) Foreign Application Priority Data

Feb. 15, 2013 (JP) ................................. 2013-027520

(51) Int. Cl.
*G02B 6/42* (2006.01)

(52) U.S. Cl.
CPC ............ *G02B 6/4256* (2013.01); *G02B 6/4292* (2013.01)

(58) Field of Classification Search
CPC ............................ G02B 6/4292; G02B 6/4256
See application file for complete search history.

(56) References Cited

U.S. PATENT DOCUMENTS

| | | | | |
|---|---|---|---|---|
| 4,547,039 A | * | 10/1985 | Caron et al. | 385/88 |
| 4,741,590 A | * | 5/1988 | Caron | 385/60 |
| 5,482,477 A | * | 1/1996 | Michael | 439/581 |
| 5,588,080 A | * | 12/1996 | Kawamura | 385/78 |
| 6,530,696 B1 | * | 3/2003 | Ueda et al. | 385/60 |
| 8,104,973 B2 | * | 1/2012 | Howard et al. | 385/59 |
| 9,151,906 B2 | * | 10/2015 | Kobayashi | G02B 6/3821 |
| 2010/0008630 A1 | * | 1/2010 | Marrapode et al. | 385/78 |
| 2010/0247040 A1 | | 9/2010 | Kuriki et al. | |

FOREIGN PATENT DOCUMENTS

| | | |
|---|---|---|
| JP | 59-151215 A | 8/1984 |
| JP | 61-204608 A | 9/1986 |
| JP | 11-064682 A | 3/1999 |
| JP | 2000-180669 A | 6/2000 |
| JP | 2008-102247 A | 5/2008 |
| JP | 2009-514038 | 4/2009 |
| WO | 2008-047740 A1 | 10/2007 |

OTHER PUBLICATIONS

Japanese Office Action for Patent Application No. 2013-027520 dated Jan. 26, 2016 and English translation.

* cited by examiner

*Primary Examiner* — Daniel Petkovsek
(74) *Attorney, Agent, or Firm* — Roberts Mlotkowski Safran & Cole, PC

(57) ABSTRACT

A ferrule fixing member includes a fixing member configured to fix a ferrule to hold an optical fiber to a retaining member including a retaining hole to insert the ferrule, a locked portion configured to be locked to a locking portion formed on the retaining member and to be restricted from moving, with respect to the retaining member, in an insertion direction of the ferrule and in a direction orthogonal to the insertion direction, and a main body configured to elastically press the ferrule toward the bottom of the retaining hole by elastic deformation thereof.

14 Claims, 6 Drawing Sheets

FERRULE FIXING MEMBER

The present application is based on Japanese patent application No. 2013-027520 filed on Feb. 15, 2013, the entire contents of which are incorporated herein by reference.

BACKGROUND OF THE INVENTION

1. Field of the Invention

The invention relates to a ferrule fixing member to fix to a retaining member a ferrule for holding an optical fiber.

2. Description of the Related Art

An optical transceiver is known that is provided with an optical sub-assembly including TOSA (Transmitter Optical Sub-Assembly) or ROSA (Receiver Optical Sub-Assembly), wherein an optical fiber is held by a ferrule fixed to the optical sub-assembly and is used as a signal transmission medium (See e.g. JP-A-2009-514038).

The optical transceiver disclosed in JP-A-2009-514038 is provided with a locking mechanism for fixing the ferrule to prevent the ferrule from coming off from the optical sub-assembly. The locking mechanism is composed of a pair of clips extending along a longitudinal direction of the ferrule, a bridge portion connecting the pair of clips at the respective center portions, a front stop ring fixed to the ferrule and a coiled spring arranged between the bridge portion and the front stop ring. In addition, a locking device serving as a rear stop ring restricts the spring and the bridge portion from moving along the longitudinal direction of the ferrule.

On the pair of clips, L-shaped fingers are provide at end portions on the optical sub-assembly side and finger levers are provided at end portions opposite to the L-shaped fingers. Gripping the finger levers causes the pair of clips to swing centering around the bridge portion and opens the L-shaped fingers. Meanwhile, an annular collar to be engaged with the L-shaped fingers is provided on the optical sub-assembly.

For attaching the ferrule to the optical sub-assembly, a user grips the finger levers of the pair of clips to swing the clips and the opened L-shaped fingers of the clips are respectively placed on the outer peripheral portion of the collar. Then, the L-shaped fingers are engaged with the collar of the optical sub-assembly by releasing the finger levers. The ferrule is thus fixed to the optical sub-assembly.

SUMMARY OF THE INVENTION

The locking mechanism disclosed in JP-A-2009-514038 is constructed such that the pair of clips, the bridge portion and the coiled spring are separate components and the bridge portion and the spring need to be held by the front stop ring and the locking device. Therefore, the cost of components and the assembly man-hour may be increased.

It is an object of the invention to provide a ferrule fixing member that is adapted to fix a ferrule with a simple structure so as to reduce the manufacturing cost thereof.

(1) According to one embodiment of the invention, a ferrule fixing member comprises:

a fixing member configured to fix a ferrule to hold an optical fiber to a retaining member comprising a retaining hole to insert the ferrule;

a locked portion configured to be locked to a locking portion formed on the retaining member and to be restricted from moving, with respect to the retaining member, in an insertion direction of the ferrule and in a direction orthogonal to the insertion direction; and a main body configured to elastically press the ferrule toward the bottom of the retaining hole by elastic deformation thereof.

Effects of the Invention

According to one embodiment of the invention, a ferrule fixing member can be provided that is adapted to fix a ferrule with a simple structure so as to reduce the manufacturing cost thereof.

BRIEF DESCRIPTION OF THE DRAWINGS

Next, the present invention will be explained in more detail in conjunction with appended drawings, wherein:

FIGS. 3A and 3B show an example configuration of the optical sub-assembly, wherein FIG. 3A is a perspective view and FIG. 3B is a cross sectional view taken along a line A-A in FIG. 3A;

FIGS. 4A and 4B show an example configuration of the ferrule fixing member in the embodiment of the invention, wherein FIG. 4A is a perspective view and FIG. 4B is a development diagram;

FIGS. 5A to 5C show a process of fixing the ferrule to the optical sub-assembly by the ferrule fixing member, wherein FIG. 5A is an explanatory diagram illustrating a state before inserting the ferrule into the optical sub-assembly, FIG. 5B is an explanatory diagram illustrating a state during attachment of the ferrule fixing member and FIG. 5C is an explanatory diagram illustrating a state after attaching the ferrule fixing member;

DETAILED DESCRIPTION OF THE PREFERRED EMBODIMENT

Embodiment

Figure 1:
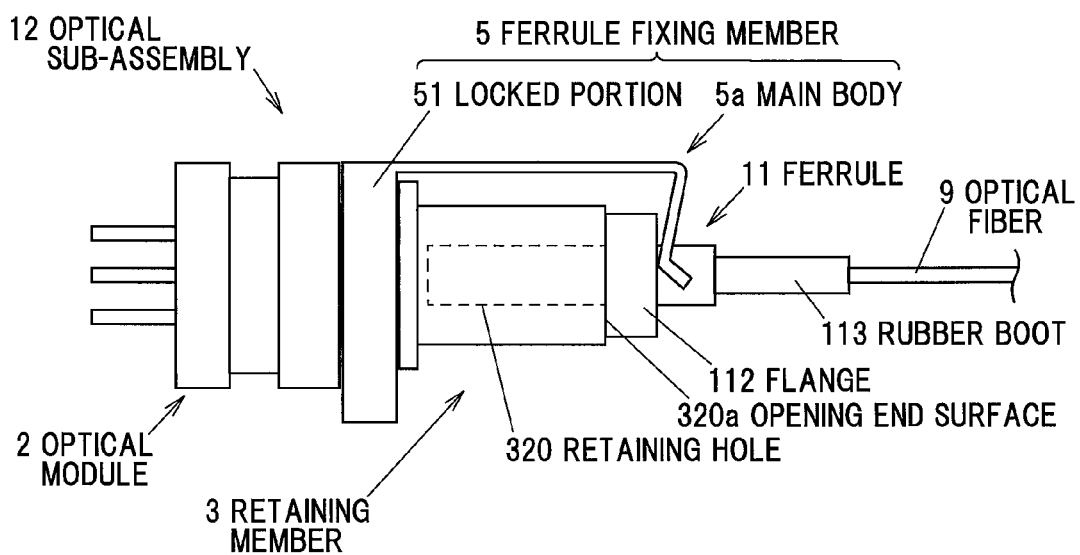
FIG. 1 is an overall configuration diagram showing a ferrule fixing member in an embodiment of the present invention, together with an optical sub-assembly and a ferrule which are fixed by the ferrule fixing member.
Figure 2:
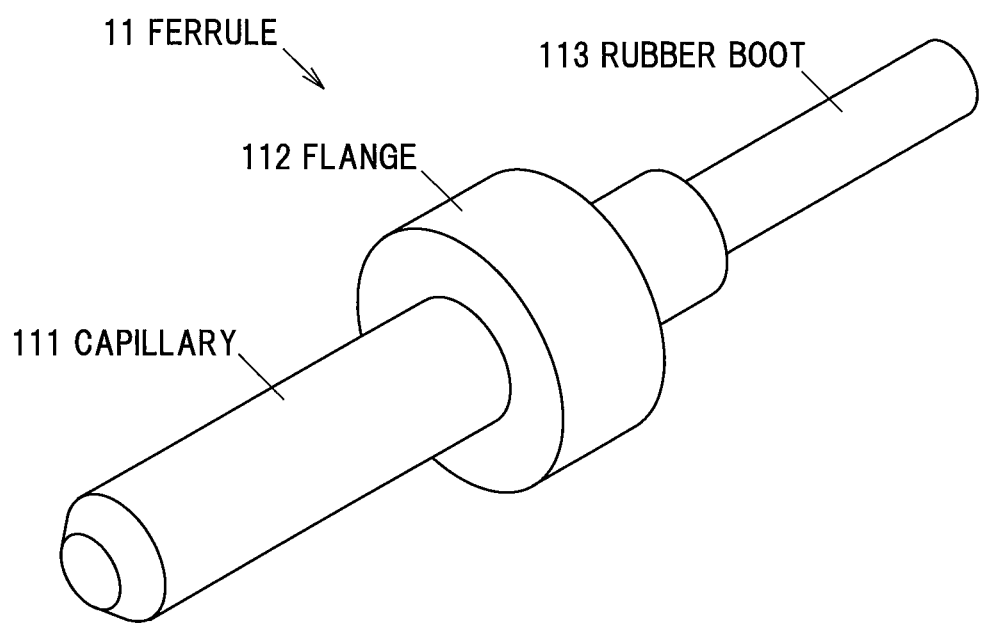
FIG. 2 is a perspective view showing an example configuration of the ferrule.

FIG. 1 is an overall configuration diagram showing a ferrule fixing member 5 in an embodiment of the invention, together with a ferrule 11 and an optical sub-assembly 12 which are fixed by the ferrule fixing member 5. FIG. 2 is a perspective view showing an example configuration of the ferrule 11.

The ferrule fixing member 5 in the embodiment is a fixing member for fixing the ferrule 11 holding an optical fiber 9 to the optical sub-assembly 12. As shown in FIG. 2, the ferrule 11 has integrally a tubular capillary 111 holding the optical fiber 9 therein and a flange 112 formed so as to protrude outward from the capillary 111. The flange 112 is, e.g., 1.8 mm in width in an extending direction of the optical fiber 9. The optical fiber 9 is led out along a rubber boot 113 which is attached to the capillary 111.

A transmitter optical sub-assembly (TOSA) or a receiver optical sub-assembly (ROSA) can be used as the optical sub-assembly 12.

The transmitter optical sub-assembly (TOSA) which is provided with a light-emitting element such as LD (Laser Diode) or VCSEL (Vertical Cavity Surface Emitting Laser) converts an electric signal, which is transmitted from another electric component of the circuit board mounting the transmitter optical sub-assembly (TOSA), into an optical signal and then emits the resulting light toward the optical fiber 9.

On the other hand, the receiver optical sub-assembly (ROSA) which is provided with a light-receiving element such as PD (Photo Diode) receives light propagating through the optical fiber 9, converts the optical signal into an electric signal and transmits the electric signal to another electric component of the circuit board mounting the receiver optical sub-assembly (ROSA).

The case where the receiver optical sub-assembly (ROSA) is used as the optical sub-assembly 12 will be described in more detail below.

The optical sub-assembly 12 has an optical module 2 having the previously mentioned light-receiving element and a retaining member 3 having a retaining hole 320 into which the ferrule 11 is inserted.

The ferrule fixing member 5 has integrally a locked portion 51 and a main body 5a. The locked portion 51 is restricted from moving, with respect to the retaining member 3, in an insertion direction of the ferrule 11 and in a direction orthogonal to the insertion direction. The main body 5a elastically presses the ferrule 11 toward the bottom of the retaining hole 320 (toward the optical module 2) by elastic deformation. The flange 112 of the ferrule 11 is pressed toward the bottom of the retaining hole 320 by the main body 5a of the ferrule fixing member 5 and thereby comes into contact with an opening end surface 320a of the retaining hole 320.

Structure of Optical Module 2

Figure 3A:
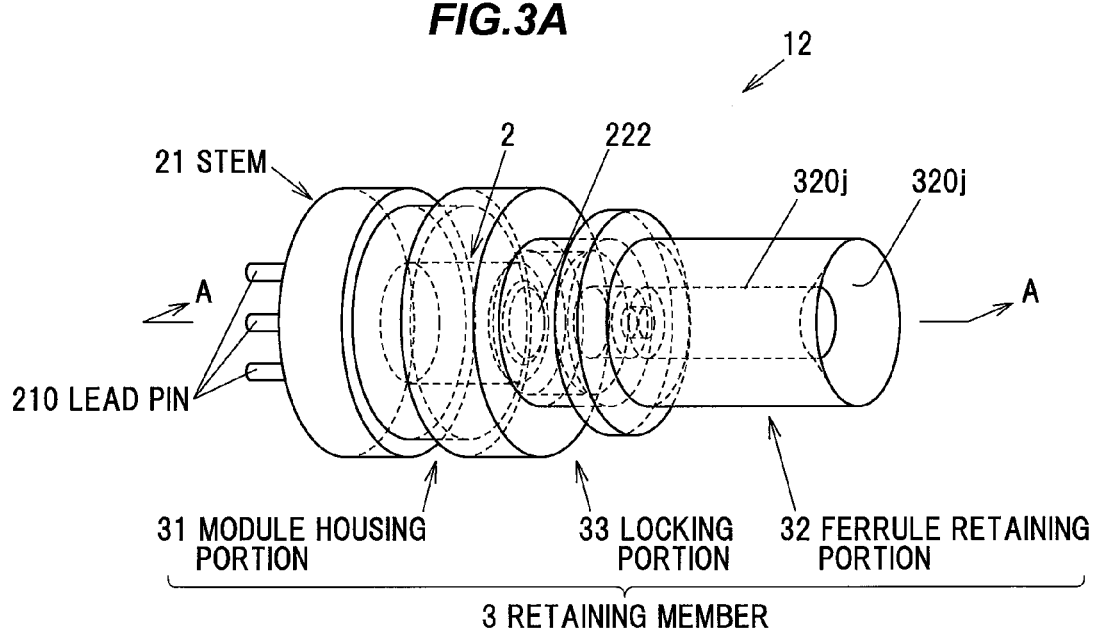
Figure 3B:
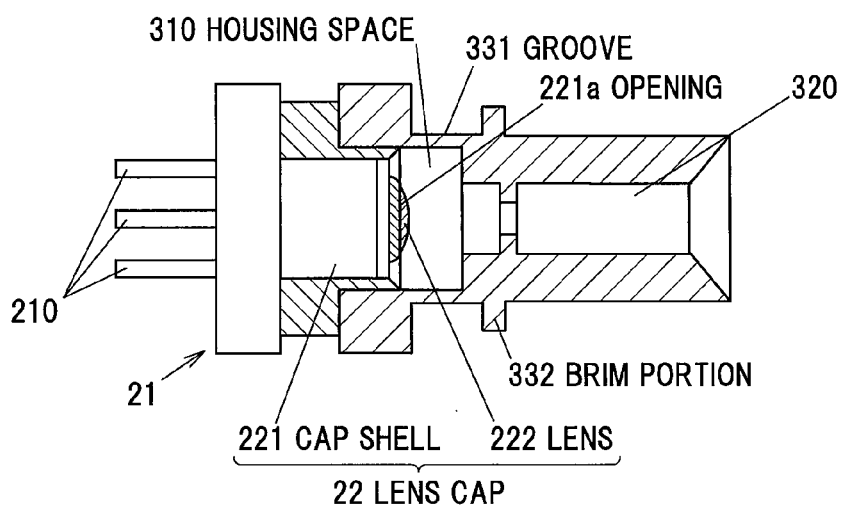

FIGS. 3A and 3B show an example configuration of the optical sub-assembly 12, wherein FIG. 3A is a perspective view and FIG. 3B is a cross sectional view taken on line A-A of FIG. 3A.

The optical sub-assembly 12 is provided with the optical module 2 having the previously mentioned light-receiving element and the retaining member 3 for holding the ferrule 11 to be inserted. The optical module 2 has a stem 21 for housing the light-receiving element and a lens cap 22. The stem 21, together with the lens cap 22, forms a CAN package. The stem 21 is electrically connected, by plural lead pins 210 (four in the present embodiment), to a non-illustrated circuit board on which the optical sub-assembly 12 is mounted. In the present embodiment, light emitted from the optical fiber 9 is focused by a lens 222, is then incident on the light-receiving element and is converted from the optical signal into an electric signal in the light-receiving element. The electric signal is transmitted through the plural lead pins 210 to another electric component mounted on the circuit board.

The lens cap 22 has the lens 222 for focusing light propagating through the optical fiber 9 and a cap shell 221 holding the lens 222. The cap shell 221 is formed of a conductive material such as FeNi alloy or stainless steel and has an opening 221a in the center of an end portion opposite to the stem 21. The lens 222 is, e.g., a ball lens formed of optical glass and is fixed in the opening 221a of the cap shell 221 in a state of being sealed with low-melting-point glass, etc.

The retaining member 3 has integrally a module housing portion 31 having a housing space 310 for housing the optical module 2, a ferrule retaining portion 32 as a cylindrical portion having the retaining hole 320 into which the ferrule 11 is inserted, and a locking portion 33 arranged between the module housing portion 31 and the ferrule retaining portion 32. The module housing portion 31, the ferrule retaining portion 32 and the locking portion 33 each have a cylindrical shape. The ferrule retaining portion 32 is, e.g., 5.15 mm in width in the insertion direction of the ferrule 11.

A groove 331 used for attaching the locked portion 51 of the below-described ferrule fixing member 5 and a brim portion 332 for restricting the locked portion 51 from moving in the insertion direction of the ferrule 11 are formed on the outer periphery of the locking portion 33. The brim portion 332 is formed to protrude outward from the ferrule retaining portion 32 and is, e.g., in 0.55 mm width in the insertion direction of the ferrule 11.

Structure of Ferrule Fixing Member 5

Figure 4A:
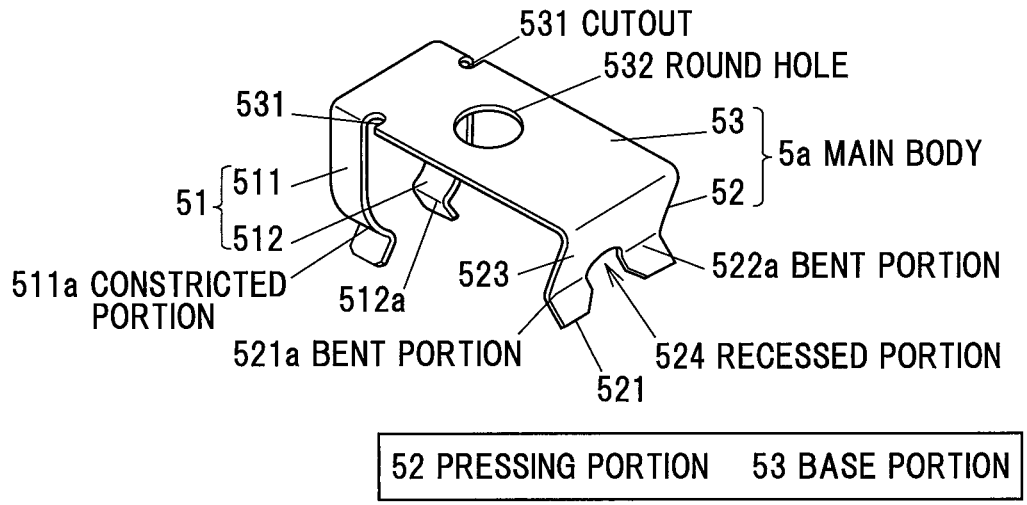
Figure 4B:
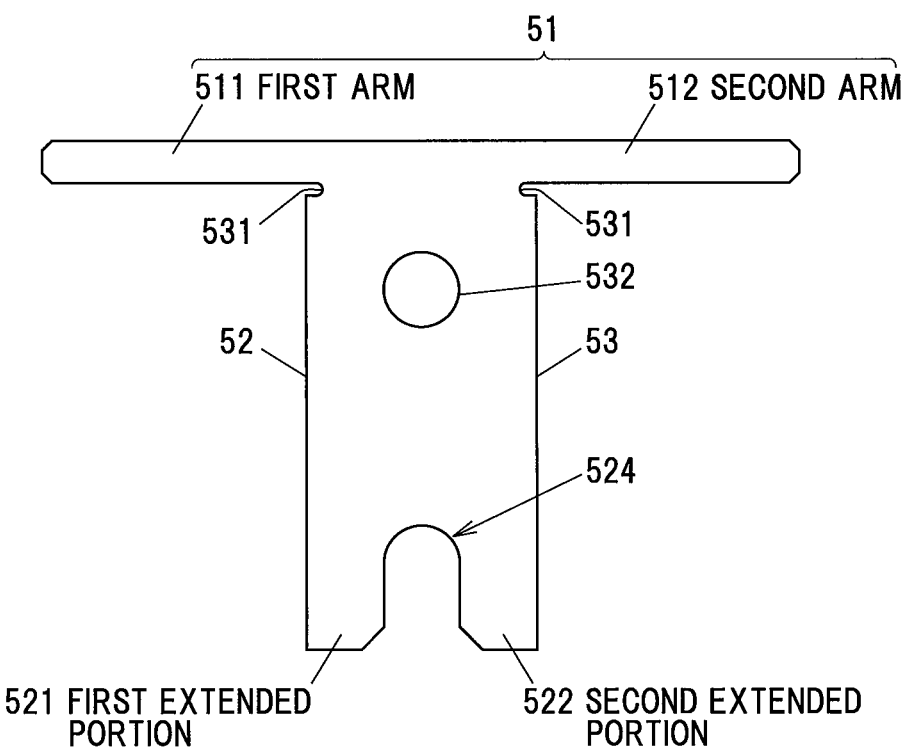

FIGS. 4A and 4B show an example configuration of the ferrule fixing member 5 in the embodiment of the invention, wherein FIG. 4A is a perspective view and FIG. 4B is a development diagram.

The ferrule fixing member 5 is shaped by bending a single plate-shaped material punched out into a predetermined shape, and has integrally the locked portion 51 to be engaged with the locking portion 33 of the retaining member 3, a pressing portion 52 for pressing the ferrule 11 toward the bottom of the retaining hole 320 (toward the optical module 2) by elastic deformation and a base portion 53 extending from a base end section 523 of the pressing portion 52 toward the locked portion 51. The base portion 53 has a rectangular shape and the longitudinal direction thereof is parallel to the insertion direction of the ferrule 11. In the present embodiment, the main body 5a (see FIG. 1) is composed of the pressing portion 52 and the base portion 53.

The locked portion 51 is constructed from a pair of arms (a first arm 511 and a second arm 512) which extend in a direction crossing the insertion direction of the ferrule 11 such that the locking portion 33 (see FIG. 3) of the retaining member 3 is to be sandwiched therebetween. A gripping force of the first arm 511 and the second arm 512 restricts the locked portion 51 from moving in a direction orthogonal to the insertion direction of the ferrule 11. In other words, movement in a direction of attaching/detaching the ferrule fixing member 5 is restricted in the present embodiment. This inhibits the ferrule fixing member 5 from coming off from the retaining member 3.

In more detail, the first arm 511 extends in a direction crossing the insertion direction of the ferrule 11 from a side portion (an edge in a lateral direction) of the base portion 53 on the opposite side to the pressing portion 52. In the present embodiment, the first arm 511 extends in a direction orthogonal to the base portion 53. A width direction (lateral direction) of the first arm 511 is parallel to the insertion direction of the ferrule 11. A thickness direction of a single plate constituting the first arm 511 crosses (orthogonal in the present embodiment) the insertion direction of the ferrule 11 and the longitudinal direction of the first arm 511.

Likewise, the second arm 512 extends in a direction crossing the insertion direction of the ferrule 11 from another side portion (an edge in a lateral direction) of the base portion 53 on the opposite side to the pressing portion 52. In the present embodiment, the second arm 512 extends in a direction orthogonal to the base portion 53. A width direction (lateral direction) of the second arm 512 is parallel to the insertion direction of the ferrule 11. A thickness direction of a single plate constituting the second arm 512 crosses (orthogonal in the present embodiment) the insertion direction of the ferrule 11 and the longitudinal direction of the second arm 512.

At end portions opposite to the base portion 53, the first arm 511 and the second arm 512 respectively have constricted portions 511a and 512a which are formed to hold the locking portion 33 of the retaining member 3.

The pressing portion 52 has a pair of extended portions (a first extended portion 521 and a second extended portion 522) which extend from the base end section 523 in a direction crossing the insertion direction of the ferrule 11. A recessed portion 524 having an arc shape along the outer periphery of the ferrule 11 is formed between the first extended portion 521 and the second extended portion 522.

The first extended portion 521 has a bent portion 521a which is bent so as to protrude toward the first arm 511 and the ridge line of the bent portion 521a is to come into contact with the flange 112. Likewise, the second extended portion 522 has a bent portion 522a which is bent so as to protrude toward the second arm 512 and the ridge line of the bent portion 522a is to come into contact with the flange 112. End portions (opposite to the base end section 523) of the first extended portion 521 and the second extended portion 522 are each tapered to guide the ferrule 11 into the recessed portion 524.

As shown in FIGS. 4A and 4B, a pair of cutouts 531 are formed on the base portion 53 to increase a curvature radius of the single plate at the time of shaping the first arm 511 and the second arm 512. In addition, a round hole 532 is formed in the middle of the base portion 53. The base portion 53 is, e.g., 7.3 mm in lateral width in the insertion direction of the ferrule 11.

Process of Fixing Ferrule 11 to Optical Sub-Assembly 12

Next, the process of fixing the ferrule 11 to the optical sub-assembly 12 by the ferrule fixing member 5 will be described in reference to FIGS. 5A to 6D.

Figure 5A:
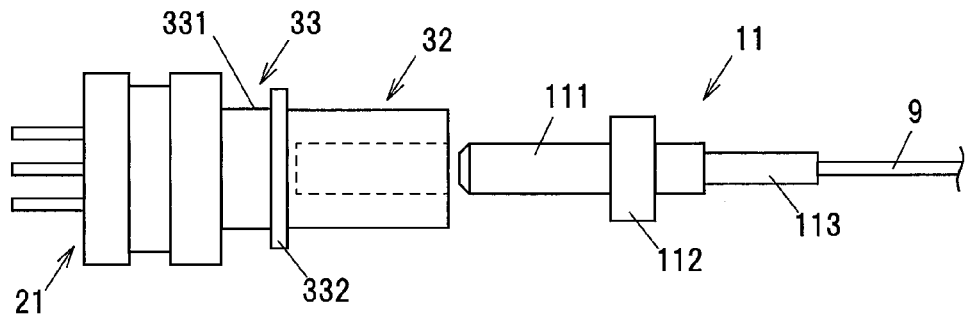
Figure 5B:
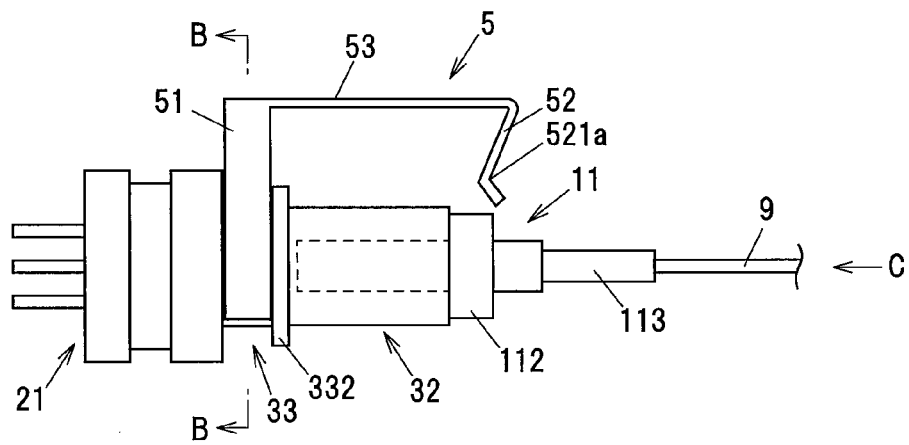
Figure 5C:
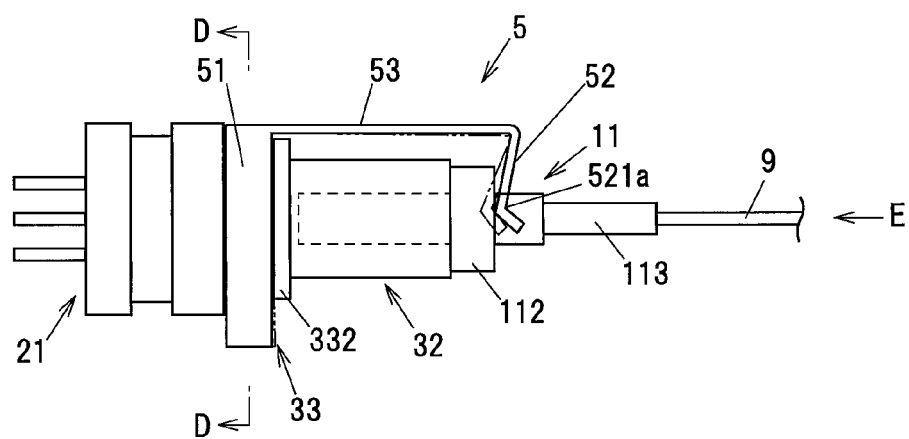
Figure 6A:
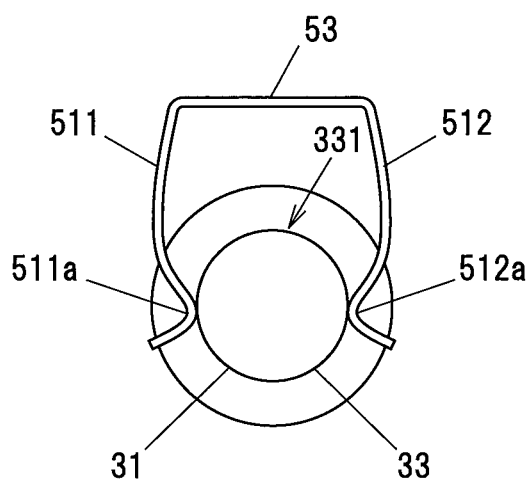
FIG. 6A is a cross sectional view taken along a line B-B in FIG. 5B.
Figure 6B:
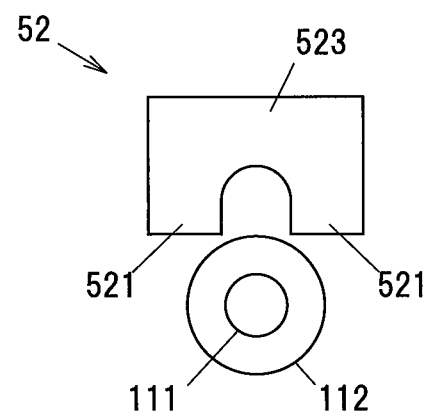
FIG. 6B is a side view along an arrow C in FIG. 5B.
Figure 6C:
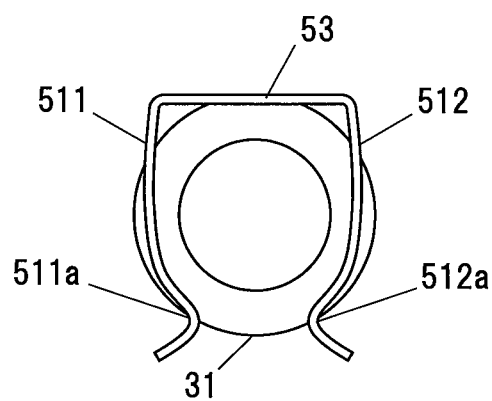
FIG. 6C is a cross sectional view taken along a line D-D in FIG. 5C.
Figure 6D:
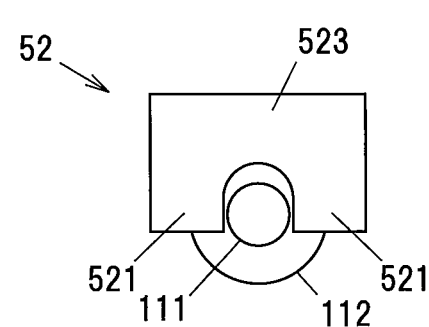
FIG. 6D is a side view along an arrow E in FIG. 5C.

FIGS. 5A to 5C show a process of fixing the ferrule 11 to the optical sub-assembly 12 by the ferrule fixing member 5, wherein FIG. 5A is an explanatory diagram illustrating a state before inserting the ferrule 11 into the optical sub-assembly 12, FIG. 5B is an explanatory diagram illustrating a state during attachment of the ferrule fixing member 5 and FIG. 5C is an explanatory diagram illustrating a state after attaching the ferrule fixing member 5. FIG. 6A is a cross sectional view taken on line B-B of FIG. 5B, FIG. 6B is a view on arrow C of FIG. 5B, FIG. 6C is a cross sectional view taken on line D-D of FIG. 5C and FIG. 6D is a view on arrow E of FIG. 5C.

The process of fixing the ferrule 11 to the optical sub-assembly 12 includes an insertion step of inserting the ferrule 11 into the optical sub-assembly 12 and a fixing step in which the ferrule fixing member 5 is attached to the optical sub-assembly 12 and the ferrule 11 to fix the ferrule 11 to the optical sub-assembly 12.

In the insertion step, the capillary 111 of the ferrule 11 is inserted into the retaining hole 320 formed in the retaining member 3 of the optical sub-assembly 12, as shown in FIG. 5A.

In the fixing step, the locked portion 51 of the ferrule fixing member 5 is inserted into the groove 331 of the retaining member 3, as shown in FIG. 5B. At this time, the constricted portion 511a of the first arm 511 and the constricted portion 512a of the second arm 512 come into contact with the outer peripheral surface of the locking portion 33 of the retaining member 3 as shown in FIG. 6A, which makes the first arm 511 and the second arm 512 open outward of the locking portion 33. Next, the pressing portion 52 of the ferrule fixing member 5 is pulled in a direction opposite to the insertion direction of the ferrule 11. This causes the base portion 53 to deflect, and the bent portion 521a of the first extended portion 521 and the bent portion 522a of the second extended portion 522 are then brought into contact with the flange 112 of the ferrule 11. A reaction force of the main body 5a (the pressing portion 52 and the base portion 53) due to elastic deformation acts on the ferrule 11 and elastically presses the ferrule 11 toward the bottom of the retaining hole 320 (toward the optical module 2). As a result, the optical sub-assembly 12 and the ferrule 11 are fixed to each other by the ferrule fixing member 5.

Functions and Effects of the Embodiment

The following functions and effects are obtained in the embodiment.

(1) The main body 5a of the ferrule fixing member 5 elastically presses the ferrule 11 toward the bottom of the retaining hole 320 of the retaining member 3 by elastic deformation, thereby fixing ferrule 11 to optical sub-assembly 12. That is, use of the ferrule fixing member 5 having a simple structure as a fixing member leads to the cost reduction.

(2) The locked portion 51 of the ferrule fixing member 5 is constructed from a pair of arms (the first arm 511 and the second arm 512) which extend in a direction crossing the insertion direction of the ferrule 11 while sandwiching the cylindrical locking portion 33 in between. Therefore, even if the pressing portion 52 applies a force to flange 112 in the insertion direction of the ferrule 11, movement of the locked portion 51 along the insertion direction of the ferrule 11 caused by such force can be suppressed. In addition, since the locked portion 51 is restricted from moving in a direction orthogonal to the insertion direction of the ferrule 11 by a gripping force of the first arm 511 and the second arm 512, the locked portion 51 is reliably locked to the locking portion 33 of the retaining member 3. As a result, it is possible to suppress misalignment at the time of bringing the bent portion 521a of the first extended portion 521 and the bent portion 522a of the second extended portion 522 of the pressing portion 52 into contact with the flange 112 of the ferrule 11. Therefore, misalignment of the optical fiber 9 and the lens 222 (misalignment of the optical axis) is suppressed.

(3) Since the locked portion 51 and the main body 5a are shaped by bending a single plate-shaped material punched out into a predetermined shape, it is not necessary to provide other members and it is thus possible to reduce the cost.

(4) Since the pair of arms (the first arm 511 and the second arm 512) of the locked portion 51 respectively have the constricted portions 511a and 512a, the first arm 511 and the second arm 51 open when inserted into the groove 331 of the locking portion 33 and the insertion is thus easy.

Summary of the Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A ferrule fixing member (5) for fixing a ferrule (11) holding an optical fiber (9) to a retaining member (3) having a retaining hole (320) for inserting the ferrule (11), integrally comprising: a locked portion (51) that is locked to a locking portion (33) formed on the retaining member (3) and is restricted from moving, with respect to the retaining member (3), in an insertion direction of the ferrule (11) and in a direction orthogonal to the insertion direction; and a main body (5a) elastically pressing the ferrule (11) toward the bottom of the retaining hole (320) by elastic deformation.

[2] The ferrule fixing member (5) described in the [1], wherein the locked portion (51) comprises a pair of arms (first arm 511 and second arm 512) that extend in a direction crossing the insertion direction of the ferrule (11) so that a cylindrical portion (ferrule retaining portion 32) of the retaining member (3) having the retaining hole (320) is sandwiched in between.

[3] The ferrule fixing member (5) described in the [2], wherein the locked portion (51) and the main body (5a) are shaped by bending a single plate-shaped material punched out into a predetermined shape.

[4] The ferrule fixing member (5) described in the [3], wherein a thickness direction of the locked portion (51) crosses the insertion direction of the ferrule (11).

[5] The ferrule fixing member (5) described in one of the [2] to [4], wherein the pair of arms (first arm 511 and second arm 512) comprise constricted portions (511a, 512a) at end portions opposite to the main body (5a) so as to hold the cylindrical portion (ferrule retaining portion 32).

Although the embodiment of the invention have been described, the invention according to claims is not to be limited to the above-mentioned embodiment. Further, please note that all combinations of the features described in the embodiment are not necessary to solve the problem of the invention.

In addition, the invention can be appropriately modified without departing from the gist of the invention. For example, although the retaining member 3 has integrally the module housing portion 31, the ferrule retaining portion 32 and the locking portion 33 in the embodiment, it is not limited thereto. The retaining member 3 may be formed by combining separate members.

In addition, although the base portion 53 of the ferrule fixing member 5 has a rectangular shape in the embodiment, it is not limited thereto, A handle used for attaching/detaching the ferrule fixing member 5 may be formed thereon.

In addition, although the optical sub-assembly 12 as the receiver optical sub-assembly (ROSA) has been described in the embodiment, it is not limited thereto and the transmitter optical sub-assembly (TOSA) may be used.

In addition, the configuration of the optical module 2 is not specifically limited.

What is claimed is:

1. A ferrule fixing member, comprising:
  a fixing member configured to fix a ferrule to hold an optical fiber to a retaining member comprising a retaining hole to insert the ferrule;
  a locked portion comprising a pair of arms that extend in a direction crossing an insertion direction of the ferrule so that a cylindrical portion of the retaining member having the retaining hole is sandwiched in between the ferrule and the locked portion, the locked portion being configured to be locked to a locking portion formed on the retaining member and to be restricted from moving, with respect to the retaining member, in the insertion direction of the ferrule and in all directions orthogonal to the insertion direction of the ferrule by a gripping force applied to the retaining member by the pair of arms; and
  a main body configured to elastically press the ferrule toward the bottom of the retaining hole by elastic deformation thereof.

2. The ferrule fixing member according to claim 1, wherein the locked portion and the main body are shaped by bending a single plate of material punched out into a predetermined shape.

3. The ferrule fixing member according to claim 2, wherein a thickness direction of the locked portion crosses the insertion direction of the ferrule.

4. The ferrule fixing member according to claim 1, wherein the pair of arms comprise constricted portions comprising bends at end portions opposite to the main body so as to hold the cylindrical portion of the retaining member.

5. The ferrule fixing member according to claim 1, wherein:
  the main body comprises a base portion having a rectangular shape; and
  the pair of arms comprises a first arm extending orthogonally from the base portion and a second arm extending orthogonally from the base portion.

6. The ferrule fixing member according to claim 5, wherein:
  the first arm comprises a first constricted portion and the second arm comprises a second constricted portion; and
  a distance between the first constricted portion and the second constricted portion is less than an outer diameter of the locking portion of the retaining member when the locked portion is locked to the locking portion of the retaining member.

7. The ferrule fixing member according to claim 5, wherein the main body comprises a pressing portion comprising a first extended portion and a second extended portion each extending from the base portion in a direction crossing the insertion direction of the ferrule.

8. The ferrule fixing member according to claim 7, wherein the pressing portion comprises a recessed portion between the first extended portion and the second extended portion.

9. The ferrule fixing member according to claim 8, wherein the recessed portion has an arc shape along an outer periphery of the ferrule.

10. The ferrule fixing member according to claim 7, wherein:
  the first arm extends from a first side edge of the base portion; and
  the second arm extends from a second side edge of the base portion different than the first side edge.

11. The ferrule fixing member according to claim 10, wherein the first extended portion and the second extended portion each extend from a base end section of the base portion.

12. The ferrule fixing member according to claim 5, further comprising:
  a first cutout in the base portion adjacent to the first arm; and
  a second cutout in the base portion adjacent to the second arm.

13. The ferrule fixing member according to claim 5, further comprising a hole in a middle of the base portion.

14. The ferrule fixing member according to claim 5, wherein a longitudinal direction of the base portion is parallel to the insertion direction of the ferrule.

* * * * *